(12) United States Patent
Dar et al.

(10) Patent No.: US 12,517,945 B2
(45) Date of Patent: Jan. 6, 2026

(54) SYSTEM AND METHOD FOR ENHANCING GENERATIVE ARTIFICIAL INTELLIGENCE (AI) MODEL-BASED DOCUMENT SEARCH WITH IMAGE RETRIEVAL

(71) Applicant: Dell Products L.P., Round Rock, TX (US)

(72) Inventors: Shaul Dar, Petach Tikva (IL); Michael Zeldich, Newton, MA (US); Ramakanth Kanagovi, Hyderabad (IN); Guhesh Swaminathan, Tamil Nadu (IN); Rajan Kumar, Nawada (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/627,576

(22) Filed: Apr. 5, 2024

(65) Prior Publication Data

US 2025/0315471 A1    Oct. 9, 2025

(51) Int. Cl.
*G06F 16/00* (2019.01)
*G06F 16/51* (2019.01)
*G06F 16/93* (2019.01)

(52) U.S. Cl.
CPC .............. *G06F 16/51* (2019.01); *G06F 16/93* (2019.01)

(58) Field of Classification Search
None
See application file for complete search history.

(56) References Cited

U.S. PATENT DOCUMENTS

2023/0351115 A1*  11/2023  Zeng .................... G06V 30/413
2024/0281487 A1*  8/2024  Bathwal ............. G06F 16/9558

* cited by examiner

*Primary Examiner* — Anhtai V Tran
(74) *Attorney, Agent, or Firm* — Brian J. Colandreo; Heath M. Sargeant; Holland & Knight LLP (57) ABSTRACT

A method, computer program product, and computing system for generating a plurality of chunks for a plurality of text portions of a document, wherein the document includes the plurality of text portions and a plurality of images. Each chunk is indexed using a word embedding. Each of the plurality of images is indexed based upon, at least in part, a position of a respective image relative to a corresponding chunk. An image placeholder is generated for each of the plurality of images. A plurality of image-enhanced embeddings is generated by inserting the image placeholder for each of the plurality of images into a respective word embedding for the corresponding chunk. The plurality of image-enhanced embeddings are provided for processing a query using a generative artificial intelligence (AI) model.

14 Claims, 8 Drawing Sheets

Cable the base enclosure appliance to switches

Do not connect the power cables until you have completed network configuration

Connect power cables }— 404

Prerequisites

If you are also installing an expansion enclosure, wait to power up the base enclosure until after you have cabled the expansion enclosure.

Steps

Plug each power cable into the base enclosure power supply

Figure 3: Inserting the power cable     ⬉— 400

Connect the other end of the power cable to the power distribution unit (PDU) on the rack    }— 406

Figure 4: Connecting to the PDU     ⬉— 402

After connecting the power cables, the bare enclosure will automatically }— 408
start up.

FIG. 6 image augmented output
(604)

To connect power cables: } 700

1. Plug each power cable into the base enclosure power supply

← 702

2. Connect the other end of the power cable to the power distribution unit (PDU) on the rack } 704

← 706

3. After connecting the power cables, the bare enclosure will automatically start up. } 708

FIG. 7

Cable the NVME expansion enclosure

Figure 42: Cabling two expansion enclosures

Figure 43: Cabling three expansion enclosures

FIG. 8

SYSTEM AND METHOD FOR ENHANCING GENERATIVE ARTIFICIAL INTELLIGENCE (AI) MODEL-BASED DOCUMENT SEARCH WITH IMAGE RETRIEVAL

BACKGROUND

Generative artificial intelligence (AI) models, such as Large Language Model (LLMs)s have recently proven to be a better alternative to traditional search engines, helping users find pieces of information they are looking for, and able to provide more concise and relevant answers, albeit with a risk that the answers may be irrelevant or incorrect.

In some instances, the query that a user types is given as input to the LLM, along an appropriate context, which is the text that the LLM should "search" for in an answer, a technique that is called prompt engineering. The main problem with this approach is that the size of the prompt is limited. For example, the limit for GPT3.5-Turbo is 4,096 tokens, the limit for GPT4 is 8,192 tokens, and the limit for GPT-4-32k is 32,768 tokens. Documents or other content that can be searched using the LLM are often orders of magnitude larger than the prompt size limit. For example, the size of a single example storage system user guide is twenty megabytes, and the size of the complete set of relevant installation documents and knowledge base articles ranges between hundreds of megabytes to hundreds of gigabytes. Accordingly, Retrieval Augmented Generation (RAG) is used to break input documents into chunks that are small enough to fit the prompt size limitations. It then uses common indexing and retrieval techniques to match user queries to the most relevant content chunks, and then combines the user query and context (one or more chunks) as a prompt to the LLM and presents the answers to the user.

One limitation associated with LLMs is that the answers provided to the user are text only, without any images. One reason is the above-mentioned prompt size limitations, and the other is the inability of language models to include images in their input and output.

SUMMARY OF DISCLOSURE

In one example implementation, a computer-implemented method executed on a computing device may include, but is not limited to, generating a plurality of chunks for a plurality of text portions of a document, wherein the document includes the plurality of text portions and a plurality of images. Each chunk is indexed using a word embedding. Each of the plurality of images is indexed based upon, at least in part, a position of a respective image relative to a corresponding chunk. An image placeholder is generated for each of the plurality of images. A plurality of image-enhanced embeddings is generated by inserting the image placeholder for each of the plurality of images into a respective word embedding for the corresponding chunk. The plurality of image-enhanced embeddings is provided for processing a query using a generative artificial intelligence (AI) model.

One or more of the following example features may be included. Indexing each of the plurality of images may include indexing each respective image with one or more of: a document identifier; an image identifier; an image caption; an image size; a character offset from the beginning of the document; a corresponding chunk identifier; and a character offset from the beginning of the corresponding chunk. The query is processed using the generative AI model. Processing the query using the generative AI model may include: generating a query embedding from the input question; identifying a similar image-enhanced embedding by determining a similarity between the query embedding and the plurality of image-enhanced embeddings; generating a prompt using the query embedding and the similar image-enhanced embedding; and providing the prompt to the generative AI model. A preliminary prompt manipulation is performed on the generative AI model for including the image placeholders for the plurality of images when processing the prompt using the generative AI model. An image placeholder is identified in an output generated by the generative AI model. The image associated with the image placeholder is inserted in the output by replacing the image placeholder with the image. Identifying the image placeholder in the output may include determining a similarity between an image caption and the query.

In another example implementation, a computer program product resides on a computer readable medium that has a plurality of instructions stored on it. When executed by a processor, the instructions cause the processor to perform operations that may include, but are not limited to, generating a plurality of chunks for a plurality of text portions of a document, wherein the document includes the plurality of text portions and a plurality of images. Each chunk is indexed using a word embedding. Each of the plurality of images is indexed based upon, at least in part, a position of a respective image relative to a corresponding chunk. An image placeholder is generated for each of the plurality of images. A plurality of image-enhanced embeddings is generated by inserting the image placeholder for each of the plurality of images into a respective word embedding for the corresponding chunk. The plurality of image-enhanced embeddings is provided for processing a query using a generative artificial intelligence (AI) model.

One or more of the following example features may be included. Indexing each of the plurality of images may include indexing each respective image with one or more of: a document identifier; an image identifier; an image caption; an image size; a character offset from the beginning of the document; a corresponding chunk identifier; and a character offset from the beginning of the corresponding chunk. The query is processed using the generative AI model. Processing the query using the generative AI model may include: generating a query embedding from the input question; identifying a similar image-enhanced embedding by determining a similarity between the query embedding and the plurality of image-enhanced embeddings; generating a prompt using the query embedding and the similar image-enhanced embedding; and providing the prompt to the generative AI model. A preliminary prompt manipulation is performed on the generative AI model for including the image placeholders for the plurality of images when processing the prompt using the generative AI model. An image placeholder is identified in an output generated by the generative AI model. The image associated with the image placeholder is inserted in the output by replacing the image placeholder with the image. Identifying the image placeholder in the output may include determining a similarity between an image caption and the query.

In another example implementation, a computing system includes at least one processor and at least one memory architecture coupled with the at least one processor, wherein the at least one processor is configured to generate a plurality of chunks for a plurality of text portions of a document, wherein the document includes the plurality of text portions and a plurality of images. Each chunk is indexed using a word embedding. Each of the plurality of images is indexed based upon, at least in part, a position of a respective image relative to a corresponding chunk. An image placeholder is generated for each of the plurality of images. A plurality of image-enhanced embeddings is generated by inserting the image placeholder for each of the plurality of images into a respective word embedding for the corresponding chunk. The plurality of image-enhanced embeddings is provided for processing a query using a generative artificial intelligence (AI) model.

One or more of the following example features may be included. Indexing each of the plurality of images may include indexing each respective image with one or more of: a document identifier; an image identifier; an image caption; an image size; a character offset from the beginning of the document; a corresponding chunk identifier; and a character offset from the beginning of the corresponding chunk. The query is processed using the generative AI model. Processing the query using the generative AI model may include: generating a query embedding from the input question; identifying a similar image-enhanced embedding by determining a similarity between the query embedding and the plurality of image-enhanced embeddings; generating a prompt using the query embedding and the similar image-enhanced embedding; and providing the prompt to the generative AI model. A preliminary prompt manipulation is performed on the generative AI model for including the image placeholders for the plurality of images when processing the prompt using the generative AI model. An image placeholder is identified in an output generated by the generative AI model. The image associated with the image placeholder is inserted in the output by replacing the image placeholder with the image. Identifying the image placeholder in the output may include determining a similarity between an image caption and the query.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
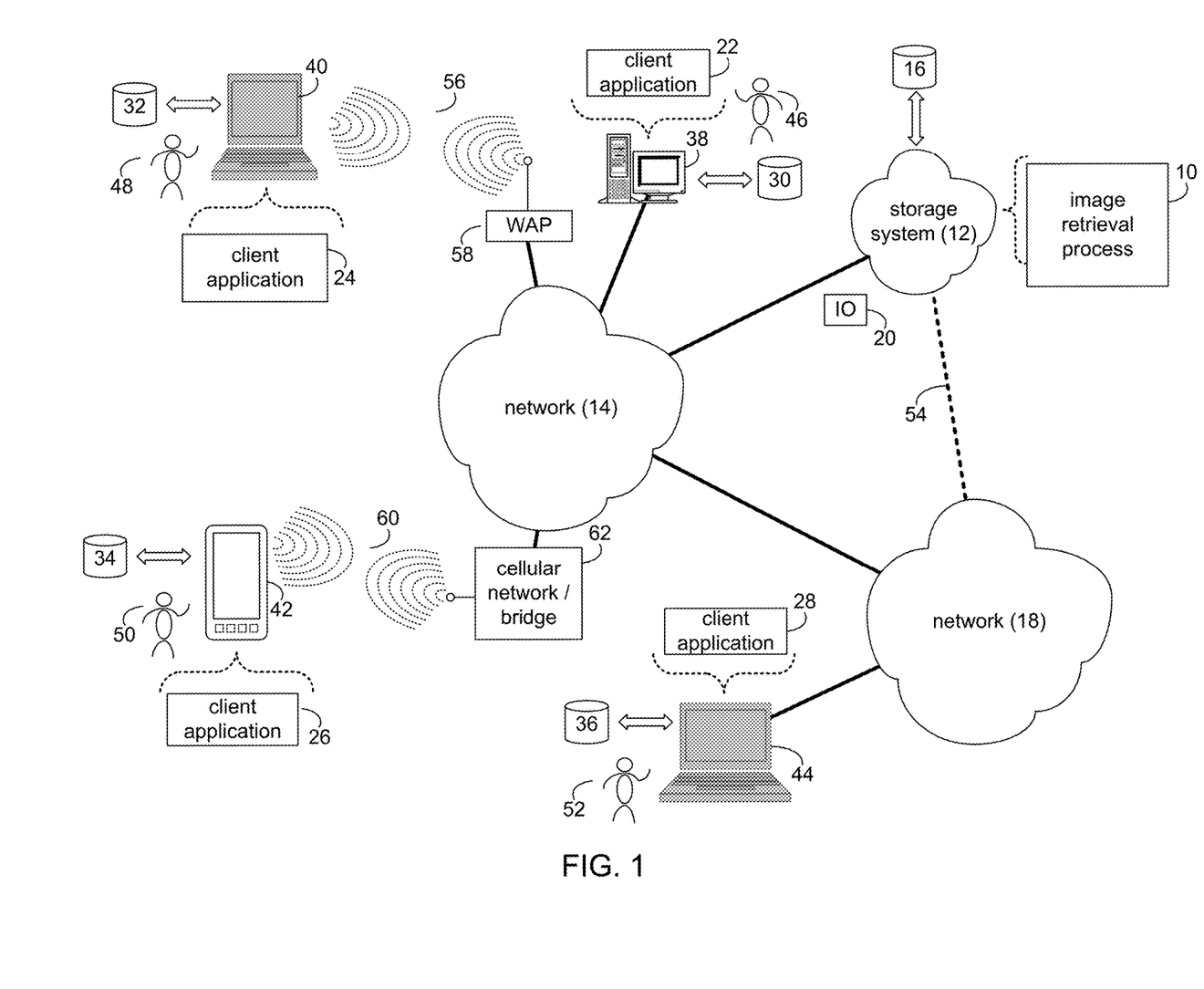
FIG. 1 is an example diagrammatic view of a storage system and an image retrieval process coupled to a distributed computing network according to one or more example implementations of the disclosure.

Referring to FIG. 1, there is shown image retrieval process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a minicomputer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of image retrieval process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random-access memory (RAM); a read-only memory (ROM); and all forms of flash memory storage devices. Additionally/alternatively, some portions of the instruction sets and subroutines of image retrieval process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g., IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, an image retrieval process, such as image retrieval process 10 of FIG. 1, may include but is not limited to, generating a plurality of chunks for a plurality of text portions of a document, wherein the document includes the plurality of text portions and a plurality of images. Each chunk is indexed using a word embedding. Each of the plurality of images is indexed based upon, at least in part, a position of a respective image relative to a corresponding chunk. An image placeholder is generated for each of the plurality of images. A plurality of image-enhanced embeddings is generated by inserting the image placeholder for each of the plurality of images into a respective word embedding for the corresponding chunk. The plurality of image-enhanced embeddings is provided for processing a query using a generative artificial intelligence (AI) model.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

The Storage System

Figure 2:
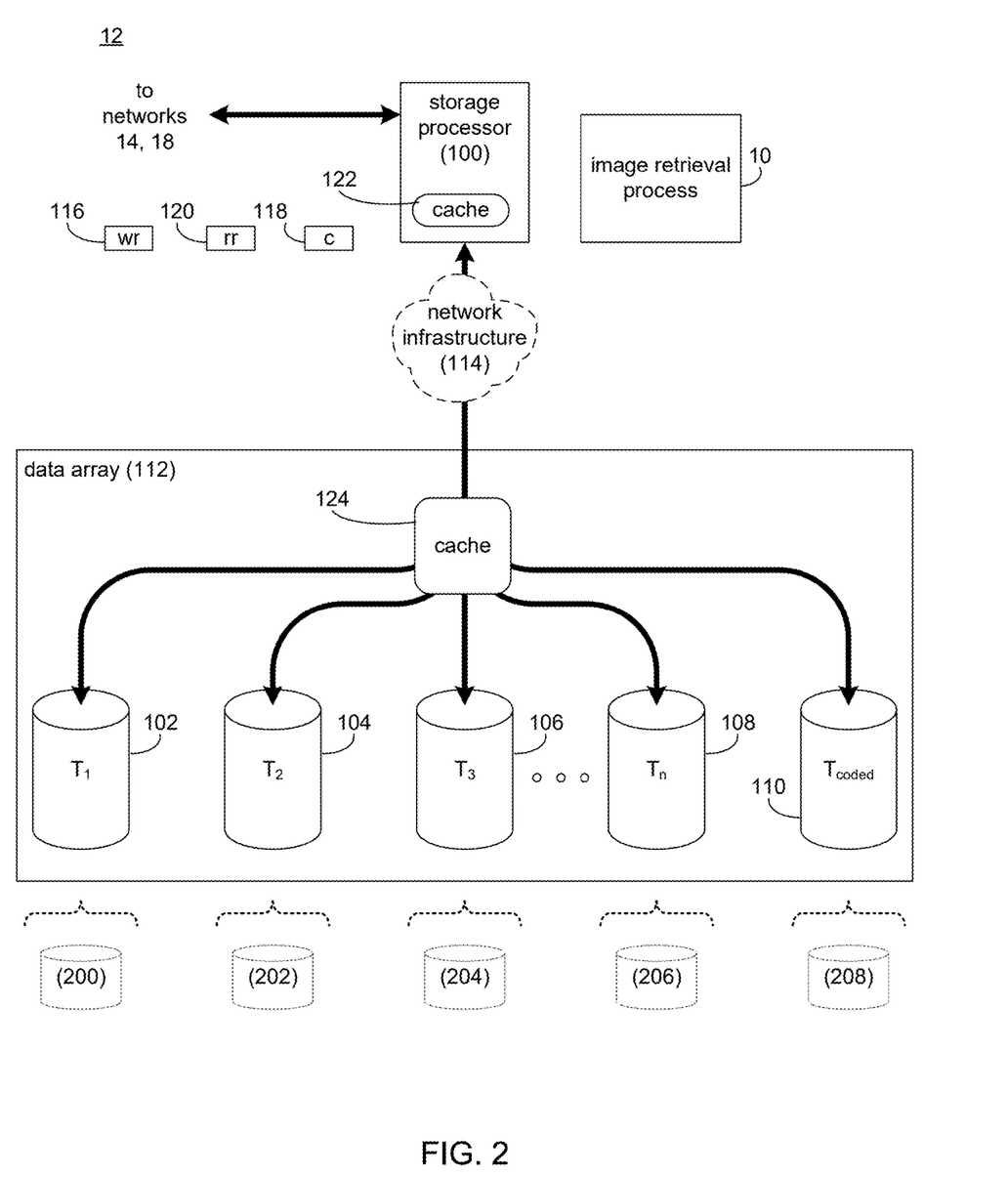
FIG. 2 is an example diagrammatic view of the storage system of FIG. 1 according to one or more example implementations of the disclosure.
Figure 3:
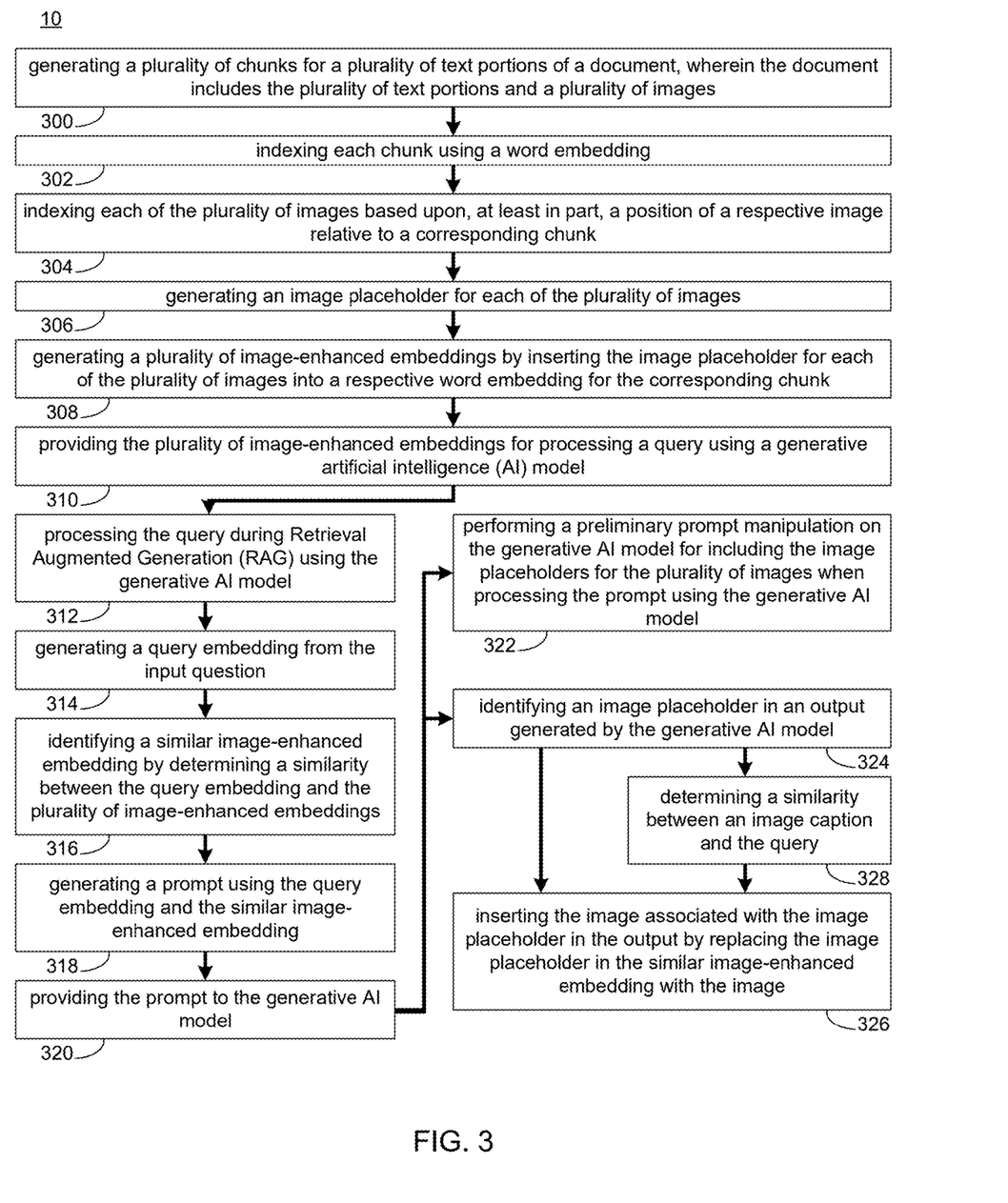
FIG. 3 is an example flowchart of image retrieval process according to one or more example implementations of the disclosure.

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g., storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g., the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g., the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of image retrieval process 10. The instruction sets and subroutines of image retrieval process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random-access memory (RAM); a read-only memory (ROM); and all forms of flash memory storage devices. As discussed above, some portions of the instruction sets and subroutines of image retrieval process 10 may be stored on storage devices (and/or executed by processors and memory architectures) that are external to storage system 12.

As discussed above, various IO requests (e.g., IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e., a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g., one or more of storage targets 102, 104, 106, 108, and coded target 110.

As discussed above, the instruction sets and subroutines of image retrieval process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of image retrieval process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g., one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Image Retrieval Process:

Referring also to the examples of FIGS. 3-8 and in some implementations, image retrieval process 10 may generate 300 a plurality of chunks for a plurality of text portions of a document, wherein the document includes the plurality of text portions and a plurality of images. Each chunk is indexed 302 using a word embedding. Each of the plurality of images is indexed 304 based upon, at least in part, a position of a respective image relative to a corresponding chunk. An image placeholder is generated 306 for each of the plurality of images. A plurality of image-enhanced embeddings is generated 308 by inserting the image placeholder for each of the plurality of images into a respective word embedding for the corresponding chunk. The plurality of image-enhanced embeddings is provided 310 for processing a query using a generative artificial intelligence (AI) model.

Figure 4:
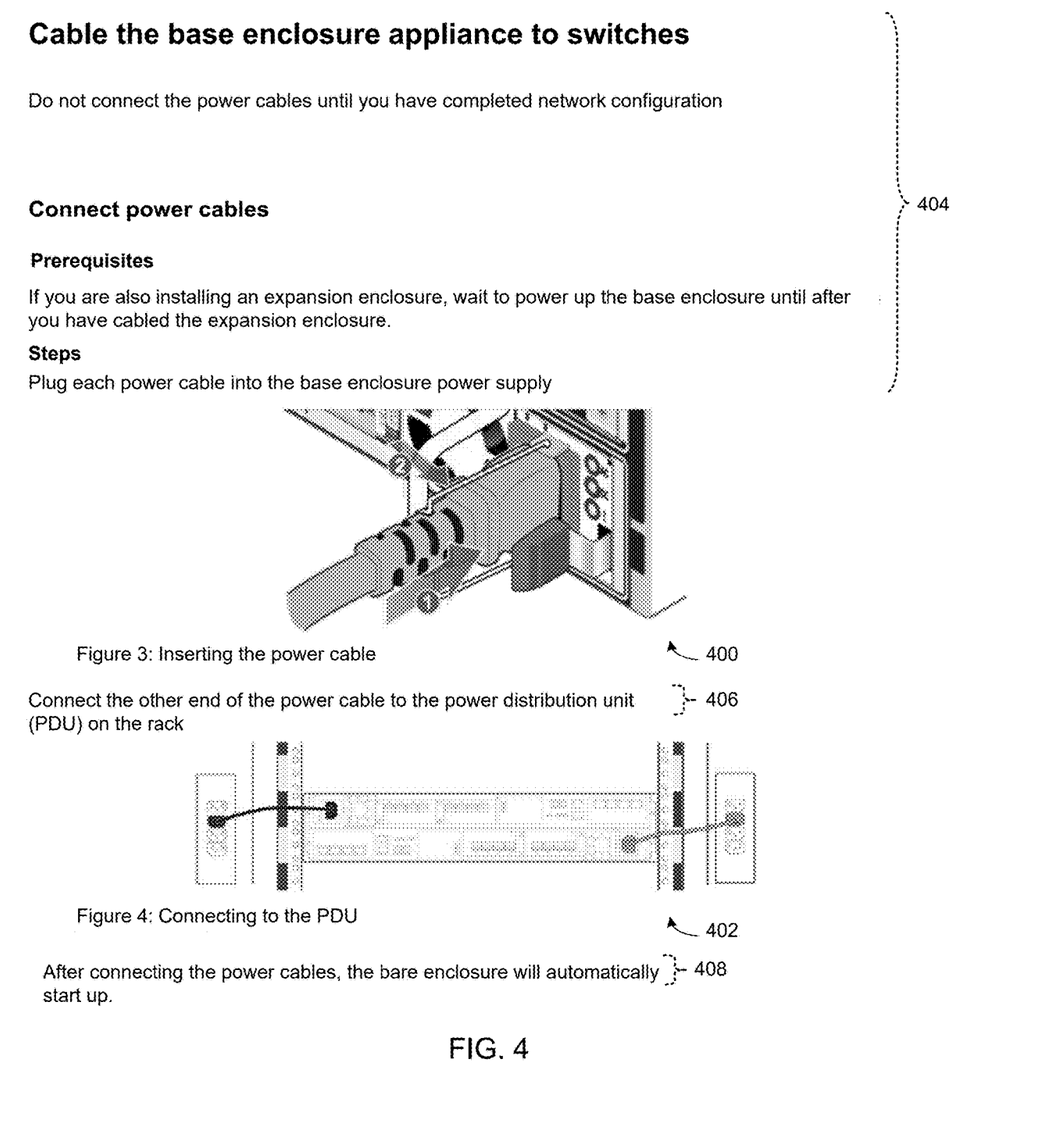
FIG. 4 is an example document with images according to one or more example implementations of the disclosure.

As will be discussed in greater detail below, implementations of the present disclosure may allow for the enhancement of conventionally text-only answers provided by a generative AI model with relevant images by extracting and indexing images relative to text chunks, matching images with queries and answers, and formatting the answers to incorporate images in a useful manner. As such, answers provided to the user's query are text only, without any images. One reason is the above-mentioned prompt size limitation, and the other is the inability of language models to include images in their input and output. For example, consider the example query "How to connect the power cables" to a document describing the operation of storage system 12 with an excerpt reproduced in FIG. 1. As shown in FIG. 4, two images (e.g., image 400, 402) are highly relevant and provide helpful context for the answer to the user query. Furthermore, if the user asks specifically about "How to connect to the power supply" then only image 400 will be relevant, while if the user asks specifically about "How to connect to the PDU" then only image 402 will be relevant. The present disclosure addresses this challenge of enhancing the text-only answers provided by generative AI models with relevant images, including the extraction and indexing of images relative to text chunks, matching images with queries and answers, and formatting the answers to incorporate images in a way that will enhance responses to queries with relevant image content.

Figure 5:
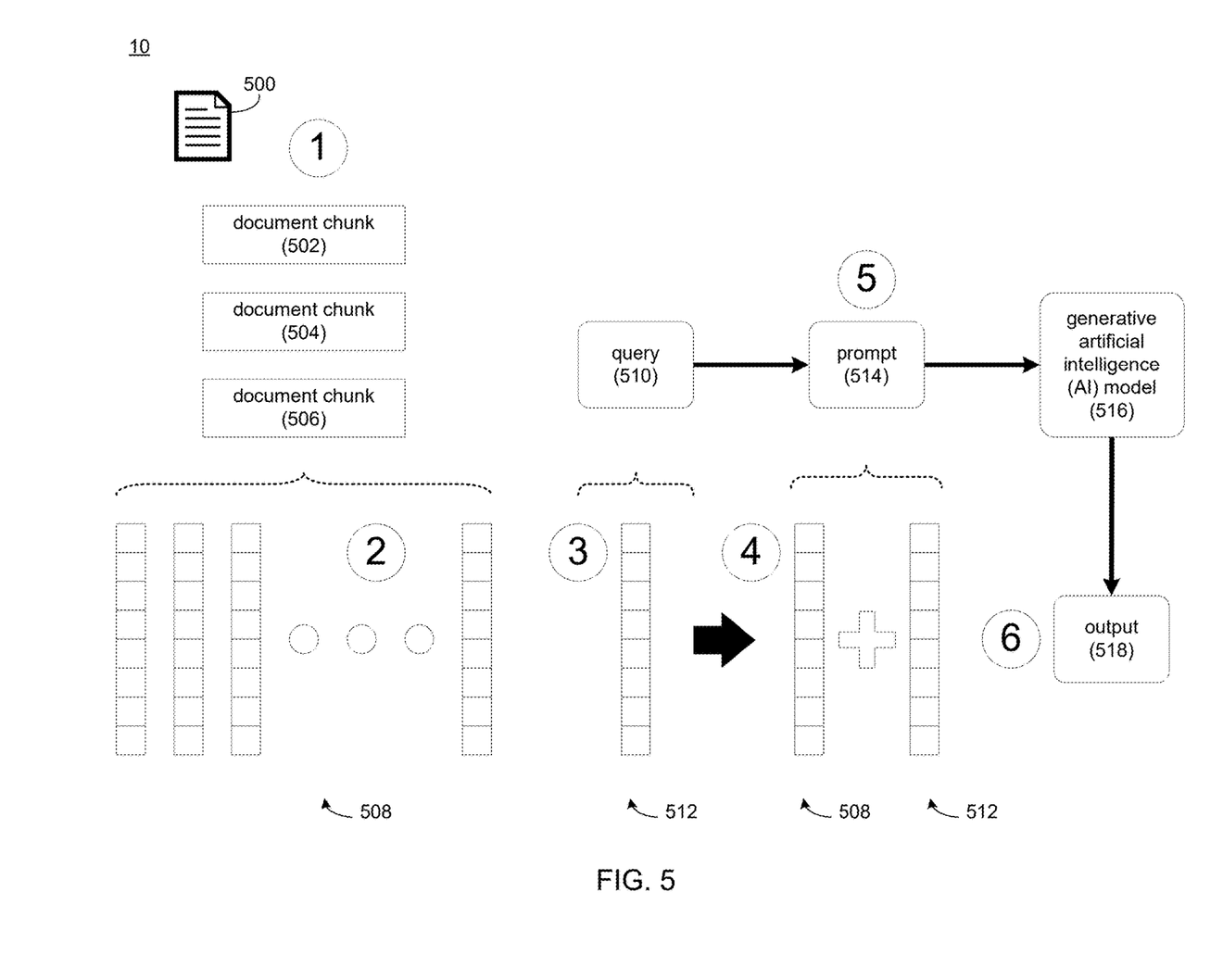
FIG. 5 is an example diagrammatic view of a retrieval augmented generation (RAG) process according to one or more example implementations of the disclosure.

Referring also to FIG. 5 and as will be discussed in greater detail below, image retrieval process 10 provides 304 a plurality of respective chunks generated using a plurality of headings and a prompt size limitation associated with a prompt of a generative artificial intelligence (AI) model for use during retrieval augmented generation (RAG). In some implementations, image retrieval process 10 is a preprocessing phase of RAG used to prepare word embeddings for use during RAG to generate prompts. As shown in FIG. 4 and when preparing an input document for retrieval augmented generation (RAG), image retrieval process 10 processes a collection of input documents (e.g., document 500) and breaking each input document into chunks (e.g., document chunks 502, 504, 506). This is shown as action "1".

Image retrieval process 10 indexes each chunk using word embeddings. For example, the Bidirectional Encoder Representations from Transformers (BERT) sentence transformer uses a space of 384 embeddings. In this example, each chunk of text is passed through the transformer, and a vector of 384 numbers corresponding to the 384 dimensions is outputted. The resulting content chunks and their vector embeddings (e.g., word embeddings 408) are stored in a database. This is shown as action "2" which completes the preprocessing of input documents for use during RAG.

Given a user query (e.g., query 510), the query text is likewise transformed into a vector of embeddings (e.g., query embedding 512). This is shown as action "3". The similarity between the query and chunks is determined to find a small set of chunks that are most similar (i.e., relevant) to the query. This is done using cosine similarity or a similar algorithm. As will be described in greater detail below, this matching step can be done efficiently using vector search. This is shown as action "4".

The query and selected chunks are combined into a prompt (e.g., prompt 514) to the LLM (e.g., generative artificial intelligence (AI) model 516). This is shown as action "5". In some implementations, a generative AI model (e.g., generative AI model 516) is a type of artificial intelligence system that is capable of generating new data samples that are similar to the training data it has been trained with. These models generally work by learning the underlying patterns and structures present in the training data and then using this "knowledge", they generate new, consistent examples. In some implementations, the generative AI model includes a Large Language Model (LLM). A LLM (e.g., GPT-4 from OpenAI®, OpenLLaMa, and Cerebras-GPT) is a language model consisting of a neural network with many parameters (typically billions of weights or more), trained on large quantities of unlabeled text using self-supervised learning or semi-supervised learning. Though trained on simple tasks along the lines of predicting the next word in a sentence, LLMs with sufficient training and parameter counts capture the syntax and semantics of human language. In some implementations, the generative AI model includes a natural language processing (NLP) model. An NLP model (e.g., XLNet, Robustly Optimized Bidirectional Encoder Representations from Transformers Pretraining Approach (ROBERTa), and Pathways Language Model (PaLM)) is a model that concerns the understanding, analysis, and generation of natural language. NLP models analyze text and speech to extract meaning, as well as generating new text or speech in response.

Many generative AI models, such as LLMs, are not trained on a particular library of input documents used for a particular scenario. As such, these generative AI models lack the context to process content from the particular library of input documents. Accordingly, the process of Retrieval Augmented Generation (RAG) is used to break the relevant input documents into chunks that are small enough to fit prompt size limitations associated with the generative AI model. Image retrieval process 10 uses common indexing and retrieval techniques to match user queries to the most relevant content chunks, and then combines the user query and context (one or more chunks) as a prompt to the generative AI model and presents the answer(s) to the user.

Returning to the example of FIG. 5. the LLM output (e.g., output 518) is presented to the user. This is shown as action "6". Accordingly, image retrieval process 10 enhances the preprocessing of input documents by generating chunks and respective word embeddings. However, as noted above, this approach does not account for the inclusion of relevant images associated with the respective chunks and is unable to provide these images in response to a query.

In some implementations, image retrieval process 10 generates 300 a plurality of chunks for a plurality of text portions of a document, wherein the document includes the plurality of text portions and a plurality of images. For example and referring again to FIG. 4, a document (e.g., document 500) includes text portions (e.g., text portions 404, 406, 408) and images (e.g., images 400, 402) corresponding to text portions 404, 406, 408. In some implementations, image retrieval process 10 generates a plurality of chunks from the plurality of text portions (e.g., text portions 404, 406, 408) of document 500. A chunk is a discrete portion of the document that is used to generate a word embedding for combination with a query embedding to provide content in a prompt provided to a generative AI model during RAG. Generating 300 the plurality of chunks includes generating an index or indexes for searching during query processing. As such, each generated chunk may be stored in a database or other data structure as an index. In this example, image retrieval process 10 generates 300 chunk 502 for text portion 404; chunk 504 for text portion 406; and chunk 506 for text portion 408.

In some implementations, image retrieval process 10 indexes 302 each chunk using a word embedding. Referring again to FIG. 5, image retrieval process 10 generates 300 a plurality of chunks as described above (e.g., document chunks 502, 504, 506) from document 500 using the hierarchical structure of document 500. Accordingly, image retrieval process 10 indexes 302 the plurality of respective chunks (e.g., document chunks 502, 504, 506) into a plurality of word embeddings (e.g., word embeddings 408) by converting each document chunk into a vector of embeddings. In some implementations, indexing 302 each chunk into a word embedding includes passing each chunk of content (i.e., text) through a transformer, and a vector of numbers corresponding to the dimensions for the vector embedding is outputted. The resulting content chunks and their vector embeddings (e.g., word embeddings 408) are stored in a database.

In some implementations, image retrieval process 10 indexes 304 each of the plurality of images based upon, at least in part, a position of a respective image relative to a corresponding chunk. For example, as respective images are positioned within a document in general proximity to the relevant text, image retrieval process 10 indexes 304 each image using its position relative to an adjacent chunk. In some implementations, indexing 304 each of the plurality of images includes indexing each respective image with one or more of: a document identifier (e.g., a document name); an image identifier (e.g., from the document, such as a running number); an image caption; an image size; a character offset from the beginning of the document; a corresponding chunk identifier; and a character offset from the beginning of the corresponding chunk. For example, image retrieval process 10 generates an index (e.g., a number or other value that is incremented for each image in the document) for each image within an image database. Each entry within the image database includes the image index and any of the document identifier; the image identifier; the image caption; the image size; the character offset from the beginning of the document; the corresponding chunk identifier; and/or the character offset from the beginning of the corresponding chunk. In some implementations and as will be described in greater detail below, image retrieval process 10 uses the image index and the additional information indexed with the image to determine how to format the image in the output.

Figure 6:
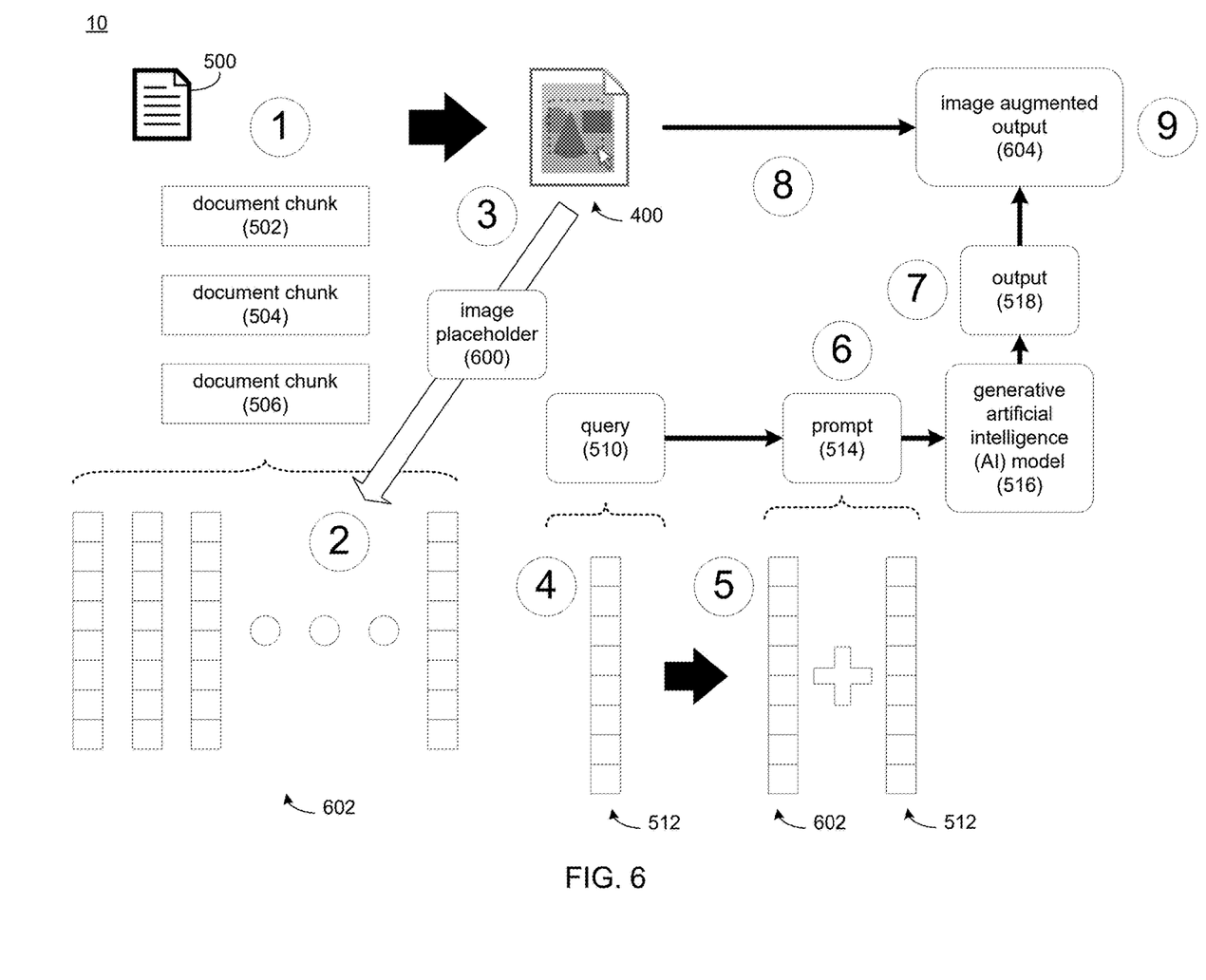
FIG. 6 is an example diagrammatic view of the image retrieval process according to various example implementations of the disclosure.

In some implementations, image retrieval process 10 generates 306 an image placeholder for each of the plurality of images. An image placeholder is a text-based identifier that is unique to each image. Image retrieval process 10 generates 306 an image placeholder (e.g., image placeholder 600) for image 400 and replaces that image that appears inside a chunk of text by image placeholder 600 that includes a reference to the specific image. In one example, image retrieval process 10 generates 306 image placeholder 600 of "|FIG. 1" for a first image in document 500. In some implementations, image placeholder 600 includes an image identifier from the document (if available) (e.g., "FIG. 3" and "FIG. 4" as shown in FIG. 4). In some implementations, image placeholder 600 is an incrementing number or other value generated for each unique image in document 500.

In some implementations, image retrieval process 10 generates 308 a plurality of image-enhanced embeddings by inserting the image placeholder for each of the plurality of images into a respective word embedding for the corresponding chunk. For example and as shown in FIG. 6, when generating an image-enhanced embedding (i.e., image-enhanced embedding 602 for text portion 404 which references image 400), image retrieval process 10 provides image placeholder 600 to combine with text portion 404 to generate image-enhanced word embedding 602. For example, the image placeholder for image 400 may be included with a chunk generated to represent text portion 404.

In some implementations, image retrieval process 10 provides 310 the plurality of image-enhanced embeddings for processing a query using a generative artificial intelligence (AI) model. For example, using the plurality of image-enhanced embeddings, image retrieval process 10 is able to process queries using generative AI model 416 using context from document 400 which include both text and images. For instance, with plurality of image-enhanced embeddings 602 generated with image placeholders, image retrieval process 10 is able to use the generative AI model to provide both relevant textual content from particular chunks and relevant images associated with the textual content from the identified chunks.

In some implementations, image retrieval process 10 processes 312 a query during Retrieval Augmented Generation (RAG) using the generative AI model. In the following example, a query (e.g., query 410) is received for processing using generative AI model 416. Processing 312 the query using the generative AI model includes generating 314 a query embedding from the input question. Image retrieval process 10 generates 314 a query embedding (e.g., query embedding 600) from query 510. Image retrieval process 10 identifies 316 a similar image-enhanced embedding by determining a similarity between the query embedding and the plurality of image-enhanced embeddings. In some implementations, the similarity is determined by calculating a cosine similarity between query embedding 512 and plurality of image-enhanced embeddings 602. However, it will be appreciated that other comparison algorithms may be used to identify a sufficiently similar image-enhanced embedding from plurality of image-enhanced embeddings 602 compared to query embedding 512. In some implementations, image retrieval process 10 uses a similarity threshold for comparing query embedding 512 and plurality of image-enhanced embeddings 602.

In some implementations, image retrieval process 10 generates 318 a prompt using the query embedding and the similar image-enhanced embedding. For example, image retrieval process 10 combines query embedding 512 and the similar image-enhanced embedding 602 to generate prompt 514. As discussed above, the combined prompt is generated using the prompt size limitation for generative AI model 516. In some implementations, image retrieval process 10 provides 320 the prompt to the generative AI model. Generative AI model 516 processes prompt 514 to generate an output (e.g., output 518).

In some implementations, image retrieval process 10 performs 322 a preliminary prompt manipulation on the generative AI model for including the image placeholders for the plurality of images when processing the prompt using the generative AI model. For example, as many generative AI models are not intuitively trained to process image placeholders to retrieve relevant images, a preliminary prompt manipulation provides instructions to guide the generative AI model to include relevant images (i.e., image placeholders) in the output (e.g., output 518). In some implementations, the implementation details of the preliminary prompt manipulation may vary with different generative AI models, however, it will be appreciated that certain fundamental elements are universal. In one example, preliminary prompt manipulation includes an initial series of queries provided by a user (or automatically using image retrieval process 10) as shown below:

Query: "If I give you text content, can you use them to answer the question {prompt_text}?"
Generative AI model output: "Yes. I will keep my answer relevant to the question."
Query: "You have a few instructions to follow while answering:
Remember to only use information provided in text content and provide direct answers.
Don't answer questions you are not sure about.
Try to provide answers as bullet pointed answer if possible.
If you are not able to find a right answer, please ask to reframe the question.
You will see lines starting with "Figure" followed by numbers and title. This is an image placeholder for images relevant to the provided context. Please include them in the answer if relevant so that, I can append the original image to it.
For the above image placeholder, please use this format "—Text|FIG. 1."
Do not include irrelevant images."
Generative AI model output: "Noted. Please provide me the text content."
Query: Query 510.

As shown above, preliminary prompt manipulation includes a description of the image placeholder that generative AI model 516 extracts from the relevant text portion. While examples of specific queries have been provided for the preliminary prompt manipulation, it will be appreciated that other expressions, languages, sequences, etc. may be used to guide generative AI model to identify image placeholder 600 in the relevant chunk.

In some implementations, image retrieval process 10 identifies 324 an image placeholder in the output generated by the generative AI model. For example and as described above using a preliminary prompt manipulation, or with training focused on recognizing image placeholders in the output, generative AI model 516 produces image placeholder (e.g., "|FIG. 1") in output 518 with the relevant text portion. In some implementations, image retrieval process 10 identifies a particular image from document 500 associated with image placeholder 600 by processing image placeholder 600 against a database of images (discussed above).

Figure 7:
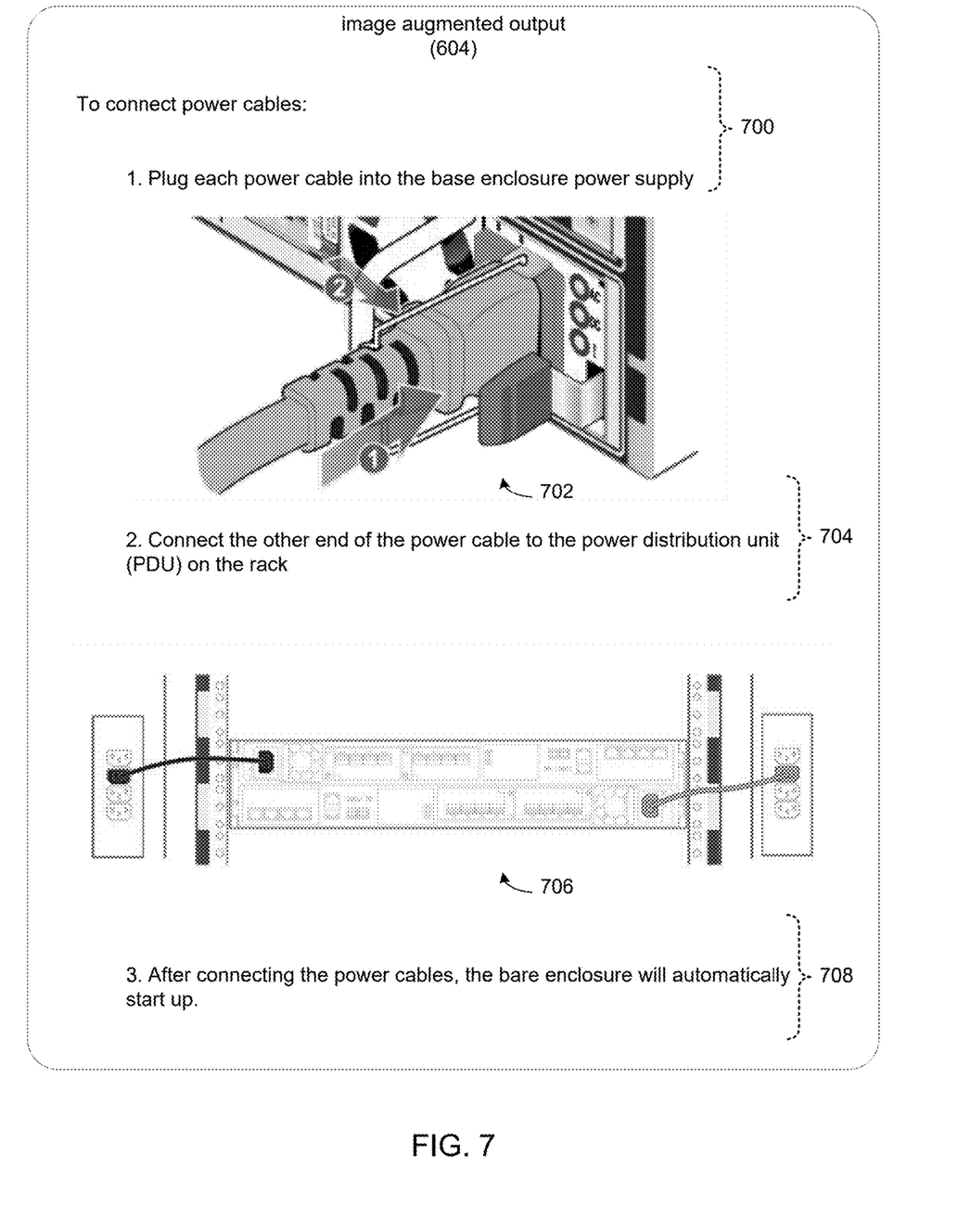
FIG. 7 is an example diagrammatic view of an image augmented output generated according to one or more example implementations of the disclosure.

In some implementations, image retrieval process 10 inserts 326 the image associated with the image placeholder in the output by replacing the image placeholder with the image. For example, image retrieval process 10 identifies a particular image from document 500 associated with image placeholder 600 from output 518 by processing image placeholder 600 against the database of images for document 500. Image retrieval process 10 inserts 326 image 400 by replacing image placeholder 600 associated with image 400 with image 400. An example of this is shown in FIG. 7 where text portion 700 and image 702 of the image augmented output (e.g., image augmented output 604) correspond to text portion 404 and image 400 of FIG. 4 and where text portion 704, image 706, and text portion 708 correspond to text portion 406, image 402, and text portion 408, respectively. Accordingly and in this example, image augmented output 604 is an answer to query 510 that is presented to the user that includes the text generated by generative AI model 516 augmented with the images that were included in the scope of this text.

Figure 8:
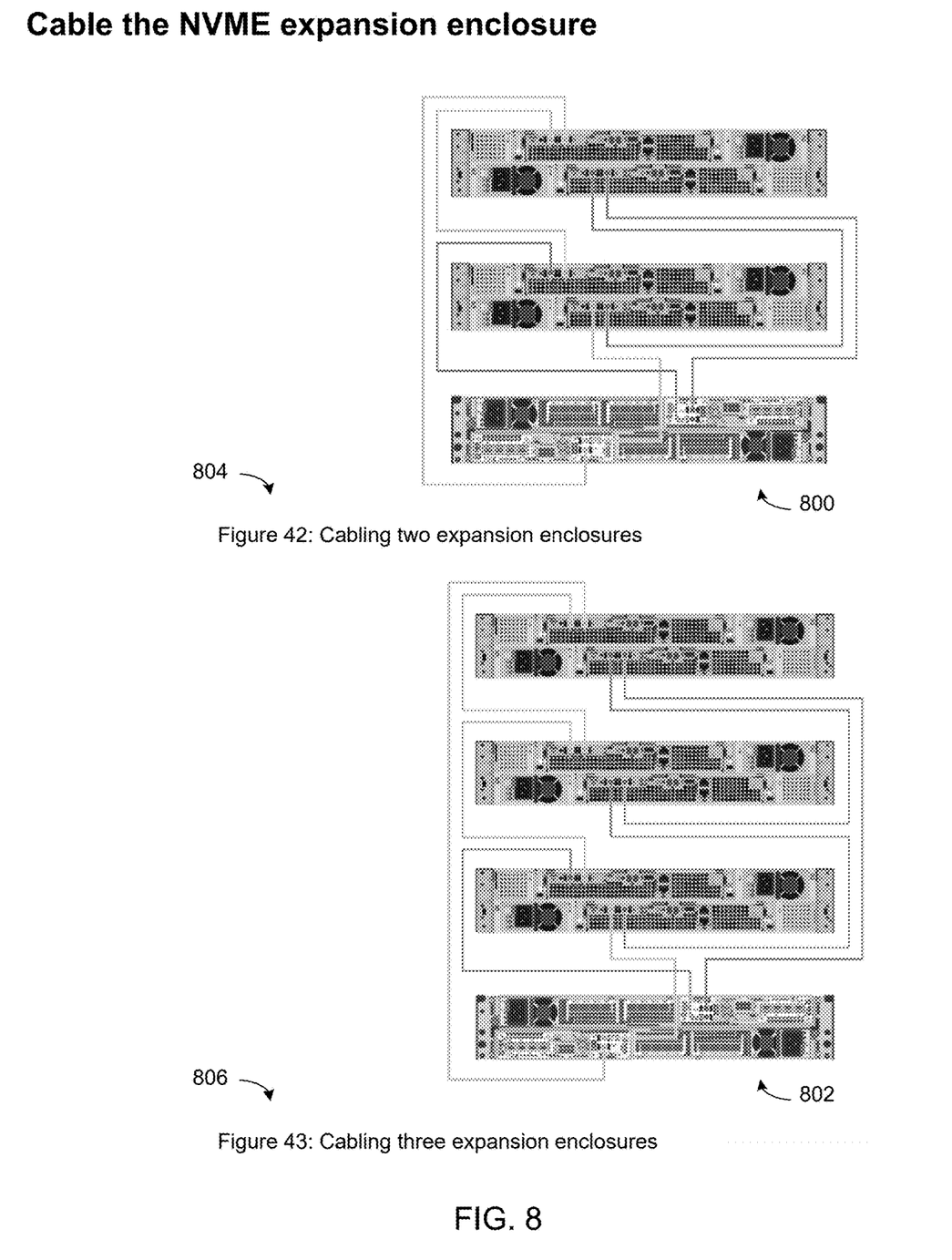
FIG. 8 is an example document with images according to one or more example implementations of the disclosure.

In some implementations, identifying 324 the image placeholder in the output includes determining 328 a similarity between an image caption and the query. For example, in some cases only certain images are relevant while others may be superfluous or even confusing. Referring also to FIG. 8, suppose document 500 includes a section titled "Cable the new NVMe expansion enclosure" with 2 images (e.g., images 800, 802). In this example, image 800 has the caption "FIG. 42. Cabling two expansion enclosures" (e.g., caption 804), and image 802 has the caption "FIG. 43. Cabling three expansion enclosures" (e.g., caption 806). Now, suppose that query 510 includes a question asking, "How to cable two new NVMe expansion enclosures?". In this example, it would be better to present an answer with only image 800, but not image 802. Accordingly, image retrieval process 10 uses image captions 804, 806 to identify a most relevant image to use in the final output provided to the user. In this example, image retrieval process 10 determines 328 a similarity match of each image caption (e.g., image 804, 806) against the query text, and image placeholders whose caption match the query above a certain threshold. In one example, cosine similarity is used to determine the similarity between an image caption and the query. In some implementations, the threshold for similarity is user-defined, a default threshold, and/or dynamically defined by image retrieval process 10. Accordingly, image retrieval process 10 selectively inserts the relevant images by inserting 326 image 800 into image augmented output 604 and not inserting image 802 into image augmented output 604. In this manner, image retrieval process 10 determines the most relevant images to insert when multiple image placeholders are identified 324 in the output from generative AI model 516.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    generating a plurality of chunks for a plurality of text portions of a document, wherein the document includes the plurality of text portions and a plurality of images;
    indexing each chunk using a word embedding;
    indexing each of the plurality of images based upon, at least in part, a position of a respective image relative to a corresponding chunk;
    generating an image placeholder for each of the plurality of images;
    generating a plurality of image-enhanced embeddings by inserting the image placeholder for each of the plurality of images into a respective word embedding for the corresponding chunk;
    providing the plurality of image-enhanced embeddings for processing a query using a generative artificial intelligence (AI) model;
    processing the query during Retrieval Augmented Generation (RAG) using the generative AI model;
    generating a query embedding from an input question;
    identifying a similar image-enhanced embedding by determining a similarity between the query embedding and the plurality of image-enhanced embeddings;
    generating a prompt using the query embedding and the similar image-enhanced embedding; and
    providing the prompt to the generative AI model.

2. The computer-implemented method of claim 1, wherein indexing each of the plurality of images includes indexing each respective image with one or more of:
    a document identifier;
    an image identifier;
    an image caption;
    an image size;
    a character offset from the beginning of the document;
    a corresponding chunk identifier; and
    a character offset from the beginning of the corresponding chunk.

3. The computer-implemented method of claim 1, further comprising:
    performing a preliminary prompt manipulation on the generative AI model for including the image placeholders for the plurality of images when processing the prompt using the generative AI model.

4. The computer-implemented method of claim 1, further comprising:
    identifying an image placeholder in an output generated by the generative AI model; and
    inserting the image associated with the image placeholder in the output by replacing the image placeholder with the image.

5. The computer-implemented method of claim 4, wherein identifying the image placeholder in the output includes determining a similarity between an image caption and the query.

6. A non-transitory computer readable medium comprising a computer program product having a plurality of instructions stored thereon which, when executed by a processor, cause the processor to perform operations comprising:

generating a plurality of chunks for a plurality of text portions of a document, wherein the document includes the plurality of text portions and a plurality of images;

indexing each chunk using a word embedding;

indexing each of the plurality of images based upon, at least in part, a position of a respective image relative to a corresponding chunk;

generating an image placeholder for each of the plurality of images;

generating a plurality of image-enhanced embeddings by inserting the image placeholder for each of the plurality of images into a respective word embedding for the corresponding chunk;

providing the plurality of image-enhanced embeddings for processing a query using a generative artificial intelligence (AI) model;

processing the query during Retrieval Augmented Generation (RAG) using the generative AI model;

generating a query embedding from an input question;

identifying a similar image-enhanced embedding by determining a similarity between the query embedding and the plurality of image-enhanced embeddings;

generating a prompt using the query embedding and the similar image-enhanced embedding; and providing the prompt to the generative AI model.

7. The non-transitory computer readable medium of claim 6, wherein indexing each of the plurality of images includes indexing each respective image with one or more of:
a document identifier;
an image identifier;
an image caption;
an image size;
a character offset from the beginning of the document;
a corresponding chunk identifier; and
a character offset from the beginning of the corresponding chunk.

8. The non-transitory computer readable medium of claim 6, wherein the operations further comprise:
performing a preliminary prompt manipulation on the generative AI model for including the image placeholders for the plurality of images when processing the prompt using the generative AI model.

9. The non-transitory computer readable medium of claim 6, wherein the operations further comprise:
identifying an image placeholder in an output generated by the generative AI model; and
inserting the image associated with the image placeholder in the output by replacing the image placeholder with the image.

10. The non-transitory computer readable medium of claim 9, wherein identifying the image placeholder in the output includes determining a similarity between an image caption and the query.

11. A computing system comprising:
a memory; and
a processor configured to generating a plurality of chunks for a plurality of text portions of a document, wherein the document includes the plurality of text portions and a plurality of images, to index each chunk using a word embedding, to index each of the plurality of images based upon, at least in part, a position of a respective image relative to a corresponding chunk, to generate an image placeholder for each of the plurality of images, to generate a plurality of image-enhanced embeddings by inserting the image placeholder for each of the plurality of images into a respective word embedding for the corresponding chunk, and to provide the plurality of image-enhanced embeddings for processing a query using a generative artificial intelligence (AI) mode
processing the query during Retrieval Augmented Generation (RAG) using the generative AI model;
generating a query embedding from an input question;
identifying a similar image-enhanced embedding by determining a similarity between the query embedding and the plurality of image-enhanced embeddings;
generating a prompt using the query embedding and the similar image-enhanced embedding; and
providing the prompt to the generative AI model.

12. The computing system of claim 11, wherein indexing each of the plurality of images includes indexing each respective image with one or more of:
a document identifier;
an image identifier;
an image caption;
an image size;
a character offset from the beginning of the document;
a corresponding chunk identifier; and
a character offset from the beginning of the corresponding chunk.

13. The computing system of claim 11, wherein the processor is further configured to:
perform a preliminary prompt manipulation on the generative AI model for including the image placeholders for the plurality of images when processing the prompt using the generative AI model.

14. The computing system of claim 13, wherein the processor is further configured to:
identify an image placeholder in an output generated by the generative AI model; and
insert the image associated with the image placeholder in the output by replacing the image placeholder with the image.

* * * * *